April 18, 1933. V. G. APPLE ET AL 1,904,943
VEHICLE CONTROL MECHANISM
Filed Jan. 13, 1930   2 Sheets-Sheet 2
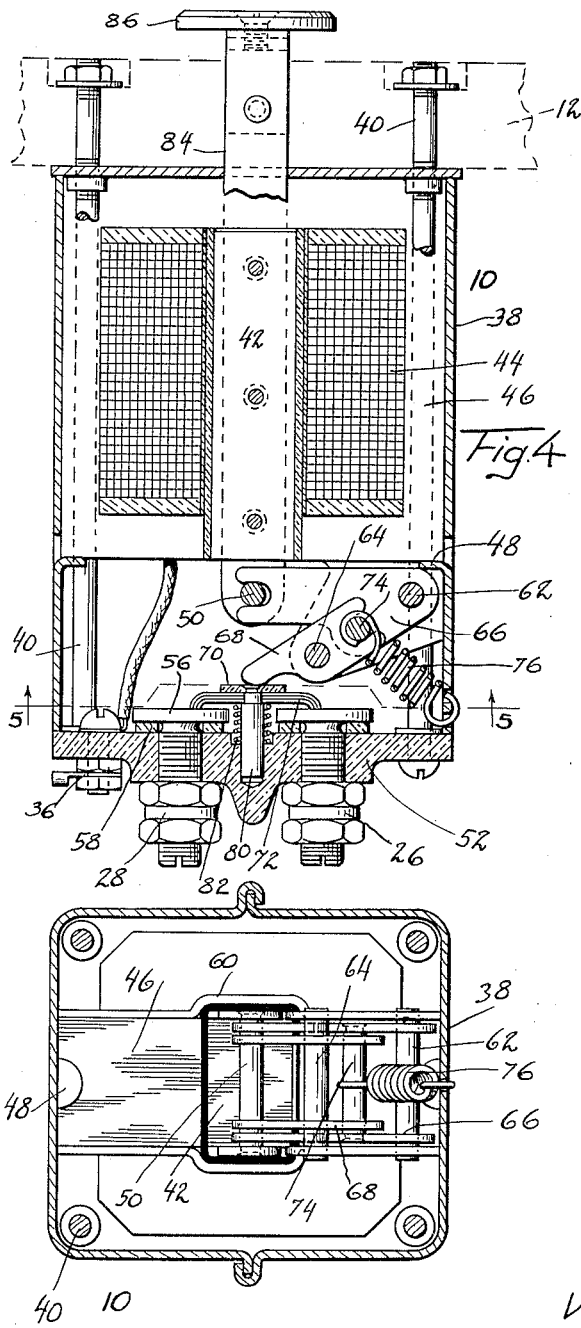
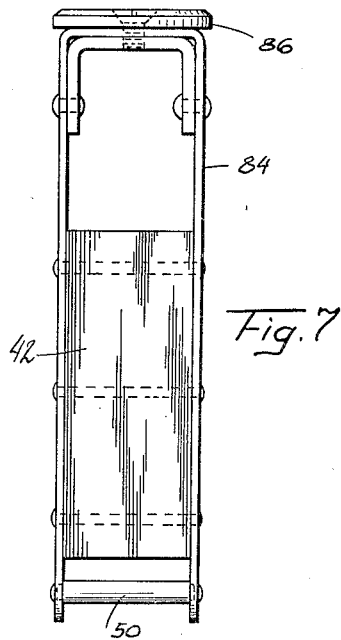
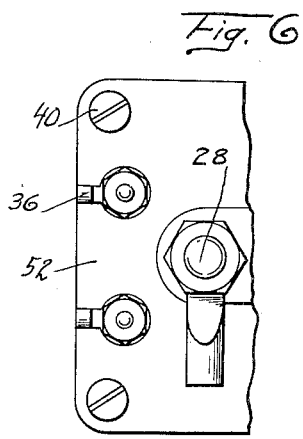
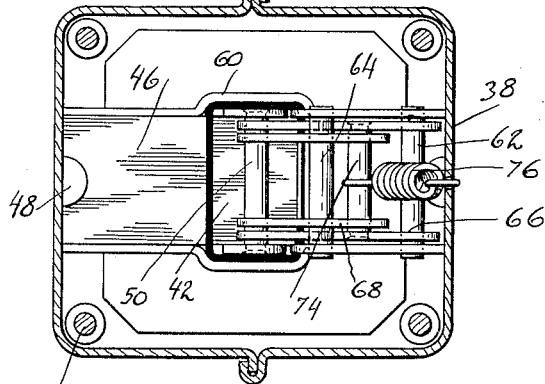
INVENTORS
Vincent G. Apple and
William H. Petit
BY
Burton & McConkey
ATTORNEYS Patented Apr. 18, 1933

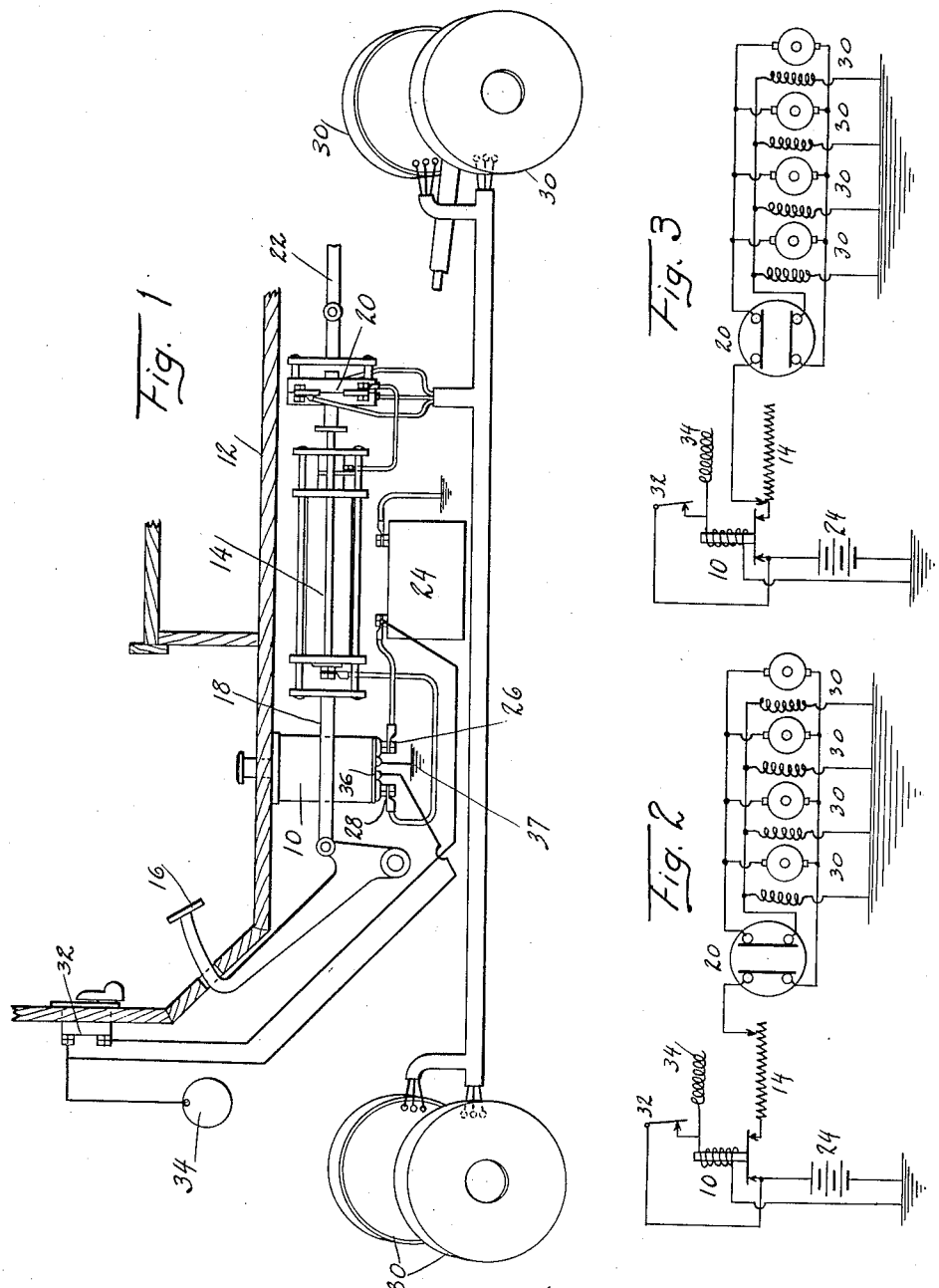

1,904,943

UNITED STATES PATENT OFFICE

VINCENT G. APPLE AND WILLIAM H. PETIT, OF DAYTON, OHIO, ASSIGNORS TO BENDIX BRAKE COMPANY, OF SOUTH BEND, INDIANA, A CORPORATION OF ILLINOIS

VEHICLE CONTROL MECHANISM

Application filed January 13, 1930. Serial No. 420,373.

Our invention relates to vehicle control mechanism that has particular reference to an interlocking electric circuit wherein the ignition switch functions as the primary control member for a system of electric brakes.

Among the objects of our invention is to provide a simple and inexpensive control for an electric brake system which includes an ignition switch interlocked through a remote control switch in the battery circuit. This control is utilized in conjunction with a reversible electric motor system which positively applies and releases the brakes, depending upon the direction of rotation of the motor shaft.

Another object of our invention resides in the provision of a remote control switch which is brought into operation upon closing a circuit therethrough to close a subsidiary switch and thus place the various electrical control mechanisms in the battery circuit.

Many other meritorius features of our invention will become apparent in the following description taken in conjunction with the accompanying drawings wherein like numerals refer to like parts throughout the several figures and wherein:

Fig. 1 is a schematic diagram of our control mechanism,

Figs. 2 and 3 are circuit diagrams,

Fig. 4 is a cross section along the longitudinal axis of our remote control switch, Fig. 5 is a cross section taken just inside of the terminal plate, Fig. 6 is a bottom view, partly broken away, and Fig. 7 is an elevation of our solenoid core member.

Fig. 1 illustrates in diagrammatic form the control mechanism as a whole and our improved remote control switch 10 is secured as illustrated to any convenient portion of the chassis or body. Here it has been illustrated as secured to the underside of the front floor boards 12.

The electrical controller 14 which constitutes a portion of the mechanical linkage between the brake pedal 16 and the brakes themselves has been illustrated broadly in this application, but has been described and claimed in detail in copending application Serial Number 285,091, filed June 13, 1928, and issuing simultaneously herewith to patent. One end of the controller is connected to the brake pedal by means of the link 18, while the other end of the controller is connected to a reversing switch 20. On the side opposite its connection to the controller this reversing switch 20 is connected through conventional linkage 22 to the brake actuating rods. As will be readily seen, pressure on the brake pedal serves to apply the brakes manually through this linkage, as well as control the power mechanism for applying them. A conventional disconnected coupling between the brake actuating cam rod and the brake rod would permit rebound of pedal 16 while the brakes were held in applied position.

In this application we have illustrated the reversing switch also only in a general way, but it is claimed and described in detail in copending application Patent Number 1,888,062, issued November 15, 1932. One terminal of the battery 24 is grounded in any convenient manner, as upon some portion of the frame, while the other terminal is connected to terminal 26 of the remote control switch. The other terminal 28 of this remote control switch 10 is connected up as illustrated to one end of the controller member 14. The other end of the controller member is connected to reversing switch 20, which in turn is connected in well known fashion to reversible electric motors, not shown here but claimed and described in detail in copending application Patent Number 1,876,-541, issued September 13, 1932, which are located within the closure of the brake drums 30.

The battery terminal which is connected to the remote control element 10 is also connected to one terminal of my ignition switch 32. The other terminal of this ignition switch is connected to the ignition mechanism 34 and also to one terminal 36 (Fig. 4) of the solenoid which actuates the remote control switch. This solenoid will be described in detail hereafter. The other terminal of the solenoid mechanism within the remote control switch 10 is grounded as indicated at 37 in Fig. 1.

The remote control switch, which is illustrated in Figs. 4 to 7, comprises a casing 38 which is secured to any convenient portion of the frame by means of the bolts 40. A solenoid comprising the armature 42, coil 44, and a core 46 is mounted within the housing, being supported upon flanges 48 stamped out of the casing 38 and turned inwardly after rolling the casing into form.

On the inner end of the armature 42 there is a transverse pin 50 extending therethrough. The bolts 40 extend through the length of casing 38 and serve to support an insulation base 52, in which are secured the solenoid terminals 36.

Extending through this insulation base 52 are the outside terminals 26 and 28, each of which is provided on its inner end with a contact plate 56, which is insulated by the washer 58.

The plates 60 serve as clamps for the core 46 and also carry the fulcrum pins 62 and 64. The lever 66 is pivoted upon the pin 62 and provided at its opposite extremity with a slot into which the pin 50 at the end of armature 42 seats. The lever 68 is pivoted at an intermediate point upon the pin 64 and one end bears against the face of an insulation washer 70 which is seated upon the top of a contact plate 72. The lever 66 is provided with a projecting nub which supports a pin 74. This pin serves as a seat for a notch which is cut in the end of lever 68 opposite to that which bears against the contact plate. A spring 76 is secured at one end of the housing 38 and at the other to the pin 74. In this way the spring 76 normally tends to retain the contact arm of lever 68 in spaced relation to the contact plate 72.

However, when the solenoid is energized its armature 42 moves axially of the control switch upwardly. This will rock the lever 66 about its pivot 62, which movement will in turn rock the lever 68 about its pivot 64 and thus tend to force the contact plate bridge member 72 against the contact plates 56 to close a circuit. This contact plate bridge member 72 is secured to the upper extremity of a stud 80 which is slidably seated as illustrated in Fig. 4. A spring 82, which seats in an annular recess provided in the insulation base 52 and surrounds the stud 80, normally retains the bridge plate 72 in spaced relation to the contact plates 72.

An extension 84 is projected through the housing 38 and capped by the plate 86. When sufficient pressure is applied to the plate 86 to overcome the pull of the solenoid the armature is forced down in the direction to permit separation of the contact plate 72 from the contacts 56.

Operation of our control mechanism will be apparent from a disclosure of the remote control switch and diagram of Fig. 1. When the ignition switch 32 is open the circuit from the battery 24 to the brakes is open. On closing the ignition switch the solenoid in our control switch operates to close the circuit from the battery to our controller member 14, thus placing the circuit to the brakes in position to be closed by actuation of the controller. As the brake pedal 16 is depressed initially, the controller is actuated and the circuit is made in a direction which rotates the electric motors to release the brakes. On further depression of the pedal the tension created in reversing switch 20 is sufficient to reverse this circuit so that the electric brake motors rotate in the proper direction to apply the brakes. After the circuit has been so reversed, still further depression of the brake pedal 16 will cause a gradual decrease of resistance in controller element 14, thereby permitting a greater amperage to flow to the brake motors and thus apply a greater braking pressure.

When the brakes are thus being applied pressure on the cap 86 will open the circuit through the switch 10, and hence through the electric brake motors, and stopping the latter and leaving the brakes locked in their applied position. Furthermore, it is obvious that upon opening the ignition switch 32 prior to releasing the brake pedal 16, the brakes will remain in their locked position because the circuit through the electric brake motors will be broken before they have reversed to release the brakes.

Having illustrated a preferred embodiment of our invention various other modifications will be apparent to those skilled in the art and for that reason we intend to limit ourselves only within the scope of the appended claims.

We claim:

1. Vehicle mechanism comprising brakes, a manually operable brake control member, an ignition switch, power mechanism for applying and releasing said brakes, means controlled by the manual exertion on said brake control member for varying the effective force transmitted by the said power mechanism, and means controlled by said ignition switch for locking the brakes in any position.

2. Vehicle control mechanism comprising a brake pedal, an ignition circuit including a solenoid operated switch, an electric brake circuit controlled by said solenoid operated switch, and means included in said brake circuit and operated by the brake pedal for reversing the brake circuit and varying the resistance therein.

3. Vehicle control mechanism comprising a brake pedal, an electric brake circuit, a reversing switch and a variable resistor included in said brake circuit, an ignition circuit which includes a solenoid operated switch, said brake circuit being controlled by a solenoid operated switch, and means controlled by said solenoid operated switch member for manually breaking the electric brake circuit independently of the ignition circuit.

4. Vehicle control mechanism comprising an ignition circuit, an electric brake circuit, means whereby said ignition circuit functions to open or close said brake circuit, a brake pedal, means whereby initial depression of said brake pedal when the brake circuit is closed causes flow of current therein in one direction, and means whereby further depression of the brake pedal reverses the direction of the flow in said circuit.

5. Vehicle control mechanism comprising an ignition circuit, an electric brake circuit, means whereby said ignition circuit functions to open or close said brake circuit, a brake pedal, means whereby initial depression of said brake pedal when the brake circuit is closed causes flow of current therein in one direction, means whereby further depression of the brake pedal reverses the direction of the flow in said circuit, and means whereby such further depression of the brake pedal decreases the resistance of said circuit.

6. An electric control mechanism for an automotive vehicle comprising brakes, an electric motor adapted to apply and release the brakes, an electric circuit through said motor controlled by a secondary switch, an ignition switch controlling said secondary switch, manual means for controlling said secondary switch independently of said ignition switch, a brake pedal, and means included in said brake circuit for varying the resistance therein in proportion to the manual effort exerted upon said pedal.

7. An electric control mechanism for an automotive vehicle comprising brakes, an electric motor adapted to apply and release the brakes, an electric circuit through said motor controlled by a secondary switch, an ignition switch controlling said secondary switch, manual means for controlling said secondary switch independently of said ignition switch, a brake pedal, a reversing switch included in said brake circuit whereby the circuit is reversed upon a predetermined movement of the brake pedal, and a variable resistor included therein whereby the resistance in circuit is decreased in direct proportion to the manual pressure exerted upon the brake pedal.

8. In combination with a motor vehicle equipped with electric brakes operable to maintain a braking action upon breaking the circuit therethrough, an electric ignition system including a switch interposed in the brake circuit and operable to open or close said circuit on breaking or making the ignition circuit respectively.

In testimony whereof, we, VINCENT G. APPLE and WILLIAM H. PETIT, sign this specification.

VINCENT G. APPLE.
WILLIAM H. PETIT.